United States Patent
Lim et al.

(10) Patent No.: US 11,048,349 B2
(45) Date of Patent: Jun. 29, 2021

(54) COMPUTER SYSTEM ALLOWING MULTIPLE USERS TO CONCURRENTLY USE WITH SINGLE MAIN COMPUTER AND OPERATION METHOD THEREOF

(71) Applicants: Cheol Soo Lim, Seoul (KR); Je Boung Kwak, Yongin-si (KR); Jae-Young Kwak, Daegu (KR)

(72) Inventors: Cheol Soo Lim, Seoul (KR); Je Boung Kwak, Yongin-si (KR); Jae-Young Kwak, Daegu (KR)

( * ) Notice: Subject to any disclaimer, the term of this patent is extended or adjusted under 35 U.S.C. 154(b) by 20 days.

(21) Appl. No.: 16/032,332

(22) Filed: Jul. 11, 2018

(65) Prior Publication Data

US 2019/0018504 A1    Jan. 17, 2019

(30) Foreign Application Priority Data

Jul. 11, 2017    (KR) .......................... 10-2017-0087581

(51) Int. Cl.
| | |
|---|---|
| *G06F 3/038* | (2013.01) |
| *H04L 29/06* | (2006.01) |
| *G06F 9/455* | (2018.01) |
| *G06F 9/451* | (2018.01) |
| *G06F 9/445* | (2018.01) |

(Continued)

(52) U.S. Cl.
CPC .......... *G06F 3/038* (2013.01); *G06F 9/44505* (2013.01); *G06F 9/452* (2018.02); *G06F 9/455* (2013.01); *H04L 29/06326* (2013.01); *H04L 29/06374* (2013.01); *H04L 67/34* (2013.01); *G06F 2203/0382* (2013.01); *H04L 41/0813* (2013.01)

(58) Field of Classification Search
CPC .... G06F 9/452; G06F 13/385; G06F 3/04883; G06F 3/038; G06F 9/455; G06F 9/44505; G06F 2203/0382; G06F 3/023; G06F 3/14; G06F 15/1735; H04L 67/34; H04L 29/06326; H04L 41/0813; H04L 29/06374
See application file for complete search history.

(56) References Cited

U.S. PATENT DOCUMENTS

| | | | |
|---|---|---|---|
| 2003/0189930 A1* | 10/2003 | Terrell | .................... H04L 49/90 |
| | | | 370/389 |
| 2004/0078456 A1* | 4/2004 | Kennedy | ............... G06F 13/385 |
| | | | 709/223 |

(Continued)

FOREIGN PATENT DOCUMENTS

| | | |
|---|---|---|
| KR | 1020040045482 A | 7/2004 |
| KR | 1020040045499 A | 7/2004 |

(Continued)

OTHER PUBLICATIONS

Citrix XenDesktop 7.6 Feature Pack 2 Blueprint, Oct. 17, 2015, 26 pages (Year: 2015).*

(Continued)

*Primary Examiner* — Yongjia Pan
(74) *Attorney, Agent, or Firm* — STIP Law Group, LLC

(57) ABSTRACT

The present invention relates to a computer system and method for allowing a plurality of users to concurrently use a single main computer by selectively transferring data between a communication port of the main computer to software running on devices of the plurality of users to enable viewing of data in realtime.

14 Claims, 14 Drawing Sheets

(51) Int. Cl.
*H04L 29/08* (2006.01)
*H04L 12/24* (2006.01)

(56) References Cited

U.S. PATENT DOCUMENTS

2005/0265385 A1* 12/2005 Cromer .................. G06F 13/24
370/466
2006/0085523 A1* 4/2006 Young ....................... G06F 9/50
709/220

FOREIGN PATENT DOCUMENTS

KR       100785264 A    11/2007
KR     1020150124356 A  11/2015

OTHER PUBLICATIONS

Com port mapping issues, Sep. 9, 2016, 6 pages (Year: 2016).*
Concepts and components, Jun. 25, 2016, 9 pages (Year: 2016).*
Remko Weijnen, The case of the COM Port Redirection, Mar. 11, 2013, 7 pages (Year: 2013).*
Net use, Aug. 31, 2016, 5 pages (Year: 2016).*
Jeff Muir, Citrix COM Port Mapping (Part I) Old and New Ways, Jun. 9, 2007, 6 pages (Year: 2007).*
Unable to access Local COM Port in Remote Session, May 8, 2009, 5 pages (Year: 2009).*
XenDesktop 7, Jun. 3, 2013, 6 pages (Year: 2013).*
Abhishek Singh, XenDesktop Architecture, Jun. 28, 2014, 7 pages (Year: 2014).*
How to Configure Citrix XenApp 6.5 on Windows Server 2008 R2, Feb. 2, 2014, 14 pages (Year: 2014).*
COM Port Redirection, Jul. 13, 2013, 6 pages (Year: 2013).*
How does COM Port Redirection work, Jun. 21, 2011, 5 pages (Year: 2011).*
Setting up USB redirection for thin clients (using RemoteFX), Sep. 14, 2013, 1 page (Year: 2013).*
XenApp and XenDesktop 7.6—New Features and Best Practices, Apr. 14, 2015, 1 page (Year: 2015).*
Martin Zugec, How to Assign Applications to Specific Servers in XenApp 7, May 2, 2017 16 pages (Year: 2017).*
Allowing Mapping of Specific USB Devices to Virtual Desktops, May 17, 2017, 5 pages (Year: 2017).*

* cited by examiner

COMPUTER SYSTEM ALLOWING MULTIPLE USERS TO CONCURRENTLY USE WITH SINGLE MAIN COMPUTER AND OPERATION METHOD THEREOF

CROSS REFERENCE TO RELATED APPLICATION

The present application claims the benefit of Korean Patent Application No. 10-2017-0087581 filed in the Korean Intellectual Property Office on Jul. 11, 2017, the entire contents of which are incorporated herein by reference.

BACKGROUND OF THE INVENTION

Field of the Invention

The present invention relates to a computer system allowing multiple users to concurrently use with a single main computer without mounting additional central processing unit or main memory unit on display units for the multiple users, and an operating method thereof, and an operation method thereof.

More particularly, the present invention relates to a computer system capable of transferring data of the computer to a plurality of user display units, namely, user monitors, without mounting additional central processing unit or main memory unit on the user display units, so that the multiple users can use the single main computer like their personal computers in real time.

Using the computer system, the users can perform their business, such as online games or financial work, through the internet by executing the relevant program installed on the computer, and can see media data in real time like their own personal computers.

Background Art

Recently, a computer system, which allows multiple users to independently use their desired computer functions with a single main computer if a program for controlling a single main computer to make it available for multiple users to independently use computer functions by connecting graphic devices, sound devices, monitors, keyboards, and mouse devices, which are the same number as the users, to the single main computer have become more widespread.

Korean Patent Application Nos. 10-2004-0045499 and 10-2004-0045482 disclose systems allowing multiple users to independently use a single computer.

Korean Patent No. 10-0785264 also discloses a multi user multimedia internet computer system capable of allowing multiple users to independently use a single computer. As described above, the multi user multimedia internet computer system includes a multi user program allowing multiple users to perform independent functions, and an extension kit per user. The conventional art has a difficulty to manufacture a special mainboard in order to construct the system allowing multiple users to use with a single computer.

The conventional arts related with the multi user system are characterized by that multiple users can mainly use by a multi-user program under a computer environment that many display units, sound units and input units per users are connected to a single main computer.

However, if many users concurrently use the multi-user system by connecting a plurality of communication devices to the single main computer, especially, if multiple users individually execute and run robot coding programs, such as Entry, Scratch, Arduino, and so on, in order to progress a computer class at a school computer room, software individually running at each multimedia device of each user is connected with any one among a plurality of communication ports of the main computer, but in this instance, it may be impossible to continue the computer class due to disturbance in connection of the communication ports.

For instance, assuming that ten user terminals, namely, multi user terminals, are connected to a single main computer and ten students are learning computer robot program called 'Entry' at the same time, ports individually connected with the students' robots by wire or wirelessly, must be connected to an USB port of the user terminal (a second communication device in the present invention). If one student first connects the port to the USB port of the user terminal, the user terminal is connected with any one port among ten communication ports of the main computer.

After that, when other students connect their terminals, the communication ports connected to the main computer disturb each other. So, when a student A operates his or her robot, a robot A is not operated but a robot B, C, D or other robot is operated, and when a student B operates his or her robot, a robot B is not operated but a robot A, C, D or other robot is operated. Despite such a serious problem, there is no measure to solve the problem.

Such a problem does not sometimes occur but may occur every class hour.

SUMMARY OF THE INVENTION

Accordingly, the present invention has been made to solve the above-mentioned problems occurring in the prior arts, and it is an object of the present invention to provide a computer system allowing multiple users to concurrently use with a single main computer so that the multiple users can use the computer more conveniently and stably.

For this, when multiple users individually execute and run robot coding programs, such as Entry, Scratch, Arduino, and so on, in order to progress a computer class at a school computer room, software individually running at each multimedia device of each user is connected with any one among a plurality of communication ports of the main computer, the computer system according to the present invention makes each of the users' multimedia devices connected to its correct position without disturbance in connection of the communication ports, thereby making a stable progress of the computer class possible.

To accomplish the above object, according to the present invention, there is provided a computer system allowing multiple users to concurrently use with a single main computer including: a main computer for generating a signal so that multiple users can use concurrently; a plurality of first communication devices for receiving the signal from the main computer; a plurality of second communication devices for receiving the signal produced by the main computer through the first communication devices, wherein each of the second communication devices transfers the signal to a monitor and receives signals from a keyboard and a mouse and sends and receives signals with the first communication device; a communication port identifying unit for identifying that any one among the plurality of second communication devices is connected with which one among the plurality of communication ports, which are formed as software of the main computer, and for transferring the signal to a control unit; and the control unit for controlling communication connection between the communication port of the main computer and the software running in the second communication device depending on the signal received from the communication port identifying unit.

In another aspect of the present invention, there is provided a computer system allowing multiple users to concurrently use with a single main computer including: a main computer for generating a signal so that multiple users can use concurrently; a plurality of communication devices for receiving the signal from the main computer, wherein each of the communication devices transfers the signal to a monitor and receives signals from a keyboard and a mouse and sends and receives signals with the main computer; a communication port identifying unit for identifying that any one among the plurality of communication devices is connected with which one among the plurality of communication ports, which are formed as software of the main computer, and for transferring the signal to a control unit; and the control unit for controlling communication connection between the communication port of the main computer and the software running in the communication device depending on the signal received from the communication port identifying unit.

Moreover, the control unit outputs information corresponding to the signal received from the communication port identifying unit to the monitor connected with the corresponding second communication device.

Furthermore, the control unit allows the software running in the second communication device to be connected with the communication port corresponding to the received signal.

Additionally, the computer system further includes: a communication port selection unit for selecting the communication port so that the software running in the second communication device is connected with any one of the plurality of communication ports formed in the main computer as software, wherein when the user of at least one second communication device selects the communication port of the information corresponding to the signal received from the communication port identifying unit through the communication port selection unit, the control unit allows the software of the second communication device to be connected with the selected communication port.

In addition, the computer system further includes: a communication port selection unit for selecting the communication port so that the software running in the second communication device is connected with any one of the plurality of communication ports formed in the main computer as software, wherein the control unit outputs information of the communication port, to which the software running in the corresponding second communication device will be connected, to be displayed at the uppermost part or to be displayed in such a way as to be differentiated from other communication ports, when the communication port selection unit is displayed on the monitor connected with the corresponding second communication device.

Moreover, the computer system designates the communication port so that any one of the plurality of communication ports formed in the main computer as software is connected with the software running in one among the plurality of second communication devices. The control unit does not change the communication port for connection with the software of the second communication device if the signal transferred by the communication port identifying unit matches the designated communication port, but changes the communication port to the designated communication port if the signal transferred by the communication port identifying unit does not match.

In another aspect of the present invention, there is provided a computer system allowing multiple users to concurrently use with a single main computer including: a main computer for generating a signal so that multiple users can use concurrently; a plurality of second communication devices or a plurality of communication devices for receiving signals produced by the main computer and transferring the signals to monitors, wherein each of the second communication devices or the communication devices sends and receives the signals with the main computer by receiving signals from a keyboard and a mouse; and a control unit, which identifies whether or not at least one second communication device among the plurality of second communication devices or at least one communication device among the plurality of communication devices is connected with one among the plurality of communication ports formed in the main computer as software and outputs information corresponding to the identified communication port to the monitor connected with the second communication device or the communication device, or which controls the software running in the second communication device or the communication device to be connected with the communication port formed in the main computer corresponding to the signal received from a communication port identifying unit.

In another aspect of the present invention, there is provided a method of operating a computer system allowing multiple users to concurrently use with a single main computer, including the steps of: a) connecting at least one among a plurality of second communication devices or a plurality of communication devices connected to a main computer to a communication port formed in the main computer as software; b) identifying the communication port, to which the second communication device is connected and which is formed as software, or the communication port, to which the communication device is connected, by a communication port identifying unit, and transferring a signal of identification to a control unit; c) outputting information corresponding to the signal received in the step b) to a monitor connected with the second communication device or the communication device by the control unit; d) displaying a communication port selection screen on the monitor connected to the second communication device or the communication device by a software module of the second communication device or the communication device; e) selecting the communication port, which is formed as software, through the communication port selection screen displayed in the step d) by a user of the second communication device or the communication device; and f) connecting the selected communication port, which is formed in the main computer as software, with software, which is running in the second communication device or the communication device, by the control unit.

In another aspect of the present invention, there is provided a method of operating a computer system allowing multiple users to concurrently use with a single main computer, including the steps of: a) designating in such a way that at least one among a plurality of communication ports, which are formed in a main computer as software, is connected to software, which is running in at least one among a plurality of second communication devices or a plurality of communication device connected to the main computer; b) connecting at least one among the plurality of second communication devices or the plurality of communication devices to at least one among a plurality of communication ports formed in the main computer as software; c) identifying the communication port, to which the second communication device is connected, or the communication port, to which the communication device is connected and which is formed as software, by a communication port identifying unit, and transferring a signal of identification to a control unit; d) deciding whether or not the signal received in the step c) matches the communication port designated in the step a) by the control unit; and e) not changing the communication port if the communication port matches the software designated in the step a) but changing the communication port to the communication port designated in the step a) if the communication port does not match according to the identification of the step d).

In another aspect of the present invention, there is provided a method of operating a computer system allowing multiple users to concurrently use with a single main computer, including the steps of: a) connecting at least one among a plurality of second communication devices or a plurality of communication devices connected to a main computer to a communication port formed in the main computer as software; b) identifying the communication port, to which the second communication device is connected and which is formed as software, or the communication port, to which the communication device is connected and which is formed as software, by a communication port identifying unit, and transferring a signal of identification to a control unit; and c) connecting the software of the second communication device or the communication device to the communication port corresponding to the signal received in the step b) by the control unit.

According to the present invention, a plurality of users can concurrently use the single main computer like their own personal computers without mounting central processing units, main memory units and core peripheral devices to a plurality of user display devices.

Moreover, the present invention is capable of making stable computer class possible by preventing communication disturbance when the users individually operate their robots during a robot-related computer class at school because the plurality of second communication devices or the plurality of communication devices are connected to the plurality of communication ports of the main computer without disturbance so as to make the system operation stable.

Furthermore, if the computer system according to the present invention is installed in each school, the computer system provides various effects, such as budget reduction and construction of eco-friendly classroom without fine dust and generation of heat from computers.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
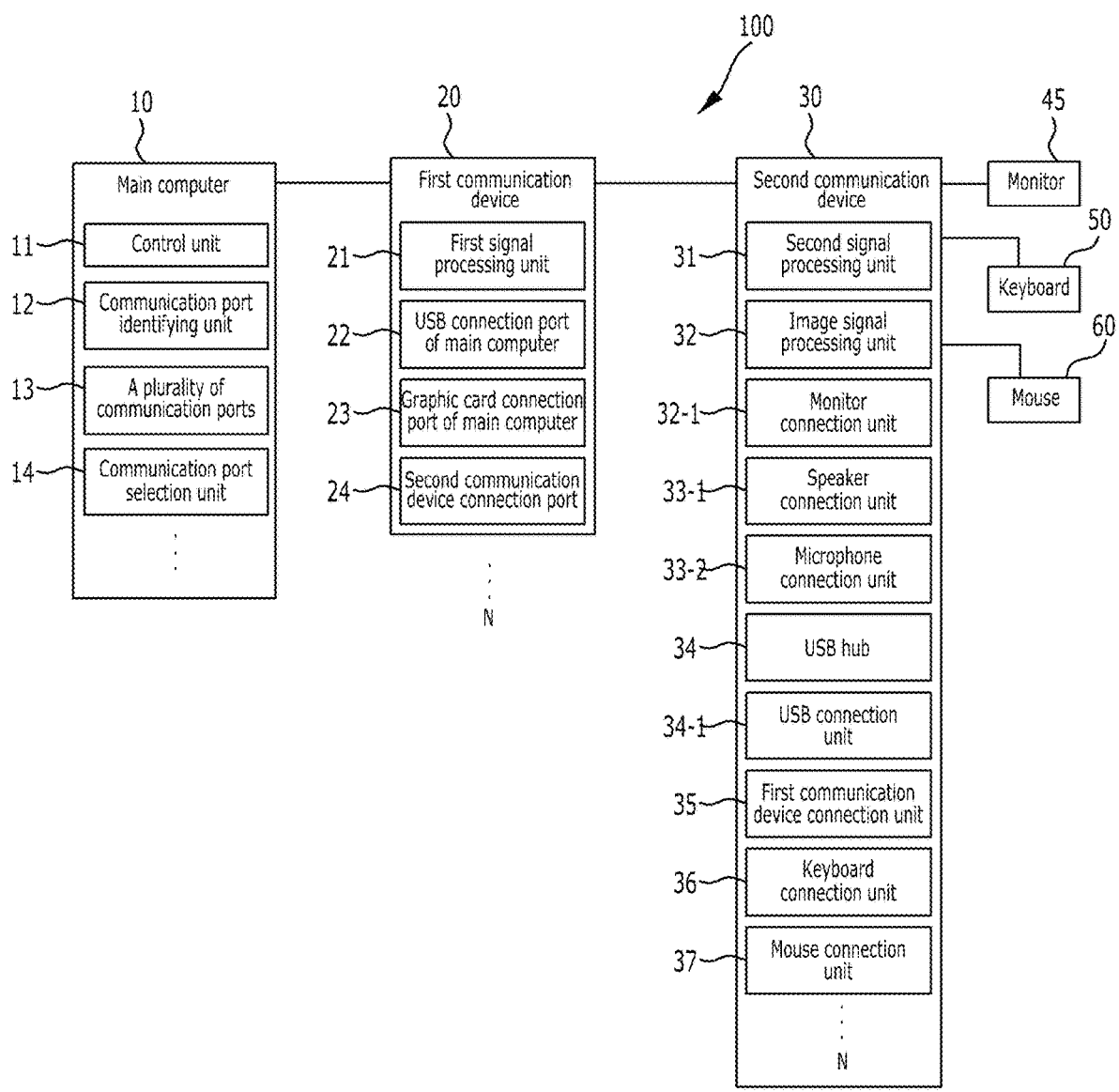
FIG. 1 is a schematic block diagram of a computer system allowing multiple users to use with a single main computer according to a preferred embodiment of the present invention.

The details of the objects and technological configurations of the present invention and corresponding advantages will become more clearly understood from the following detailed description based on the drawings accompanied by the specification of the present invention. Hereinafter, a computer system allowing multiple users to concurrently use with a single main computer and an operation method thereof according to embodiments of the present invention are described in detail with reference to the exemplary drawings.

In a case where it is determined that detailed description of well-known features and configurations according to the present disclosure and all other matters unnecessarily obscure the gist of the present disclosure, the detailed description will be omitted.

In the description of the present invention, to connect some part with another part means that some part is directly connected with another part and that some part is indirectly connected with another part through an element.

The embodiments are provided so that those skilled in the art may easily understand the technological spirit of the present invention and the present invention is not restricted by the embodiments. Furthermore, contents represented in the accompanying drawings have been diagrammed in order to easily describe the embodiments of the present invention, and may be different from forms that are actually implemented.

In the meantime, it should be also understood that the terms of 'include' or 'have' in the specification are 'open type' expressions just to say that components exit and do not exclude additional components.

The terminologies, such as the $1^{st}$, the $2^{nd}$, the $3^{rd}$, and the $4^{th}$, can be used to explain many constituent elements, but The above terminologies can be named only for telling one constituent element from the other constituent elements and the above constituent elements are not limited to the above terminologies.

Hereinafter, a computer system allowing multiple users to concurrently use with a single main computer and an operation method thereof according to embodiments of the present invention are described in detail with reference to the exemplary drawings.

In the present invention, a 'first communication device 20' means a sending and receiving unit for receiving a signal from the main computer 10 and sending the received signal to a second communication device 30, the 'second communication device 30' means a receiving unit for receiving the signal from the first communication device 20, and 'the communication device 40' means a unit for directly receiving the signal from the main computer 10, namely, a server 10, without the first communication device 20.

Moreover, in the present invention, 'a plurality of communication ports 13' exist in the main computer 10 as software, and mean communication ports that software running in the second communication device 30 or software running in the communication device 40 is systematically connected with any one among the plurality of communication ports 13. In this instance, about 200 communication ports like COM1, COM2, COM3, . . . exist in the main computer 10.

Furthermore, the plurality of communication ports 13 may be contained in an operating system (OS) installed in the main computer 10 or may be installed separately from the OS.

Additionally, the 'communication port identifying unit 12' is connected with any one among the plurality of communication ports 13 of the main computer 10 when a robot is connected to the second communication device 30 or the communication device 40, and in this instance, identifies that the robot has been connected with which communication port 13 among the plurality of communication ports 13 of the main computer 10.

In addition, assuming that the robot is connected with port number 7 among the plurality of communication ports 13, for instance, ten communication ports from port number 1 to 10, 'corresponding information 80 of the identified communication port' is '7'. When number 7 is displayed on a monitor screen, a user can see it with eyes.

Moreover, in the present invention, a 'communication port selection screen' means a screen for allowing the user to select a communication port using the corresponding information of the identified communication port.

Figure 2:
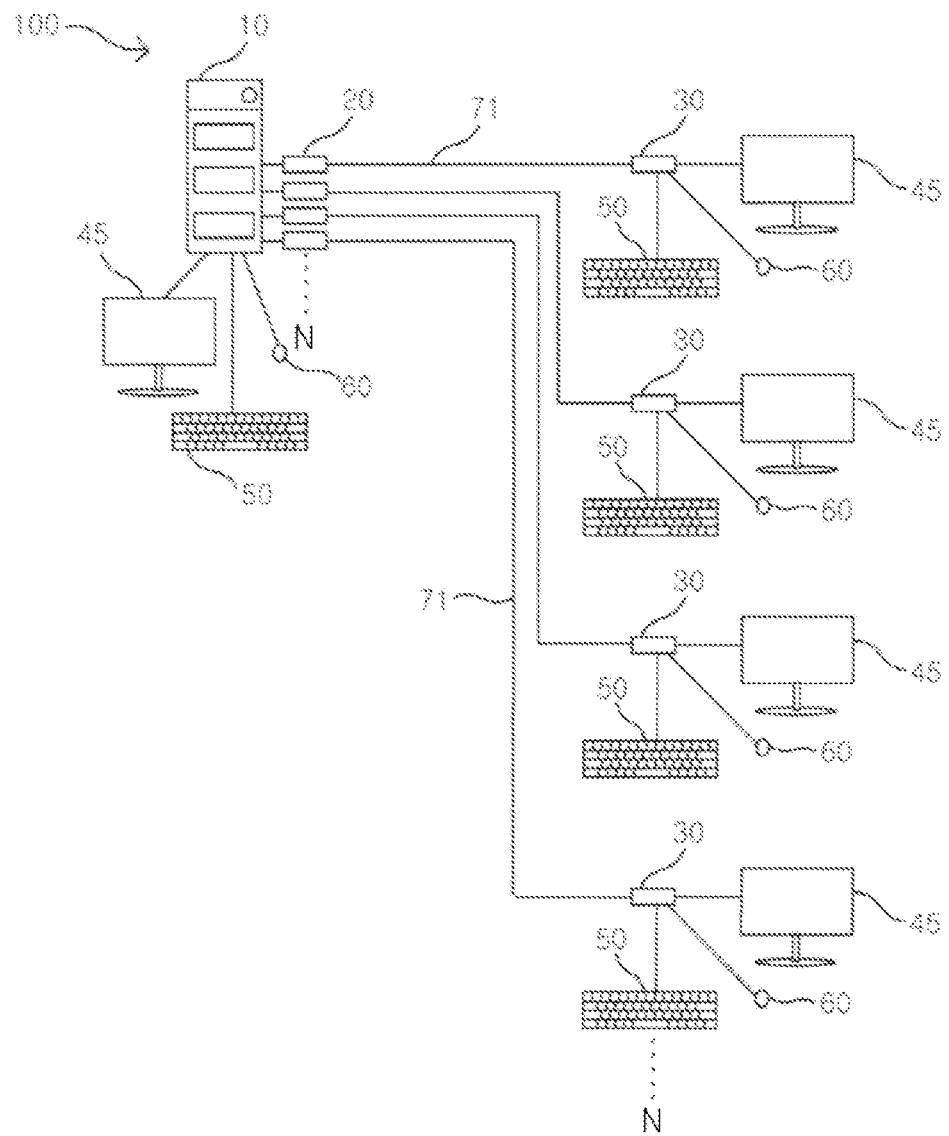
FIG. 2 is a schematic diagram of a configuration of the computer system allowing multiple users to use with the single main computer.

FIG. 1 is a schematic block diagram of a computer system allowing multiple users to use with a single main computer according to a preferred embodiment of the present invention, and FIG. 2 is a schematic diagram of a configuration of the computer system allowing multiple users to use with the single main computer.

Figure 3:
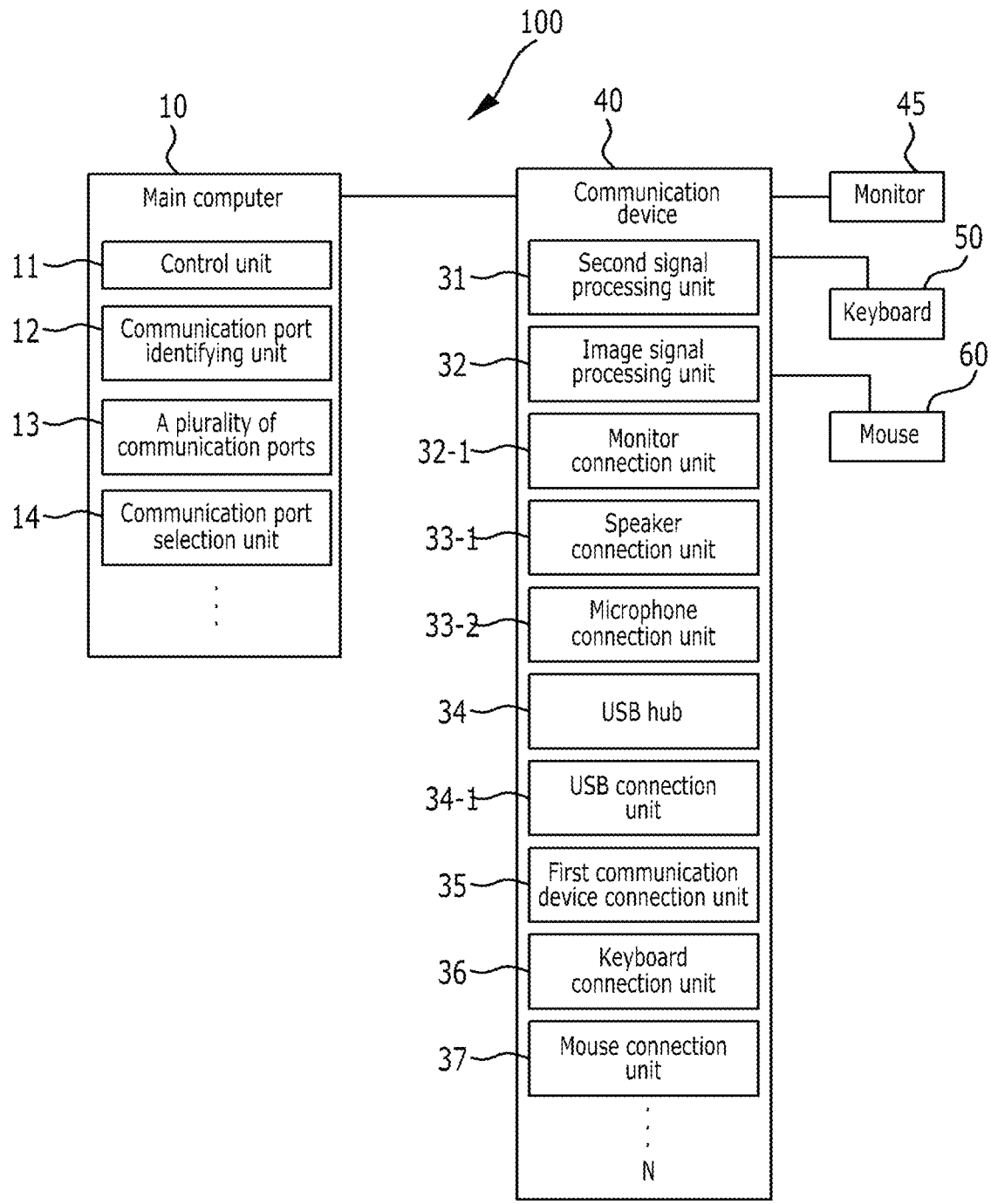
FIG. 3 is a schematic block diagram of a computer system allowing multiple users to use with a single main computer according to another preferred embodiment of the present invention.
Figure 4:
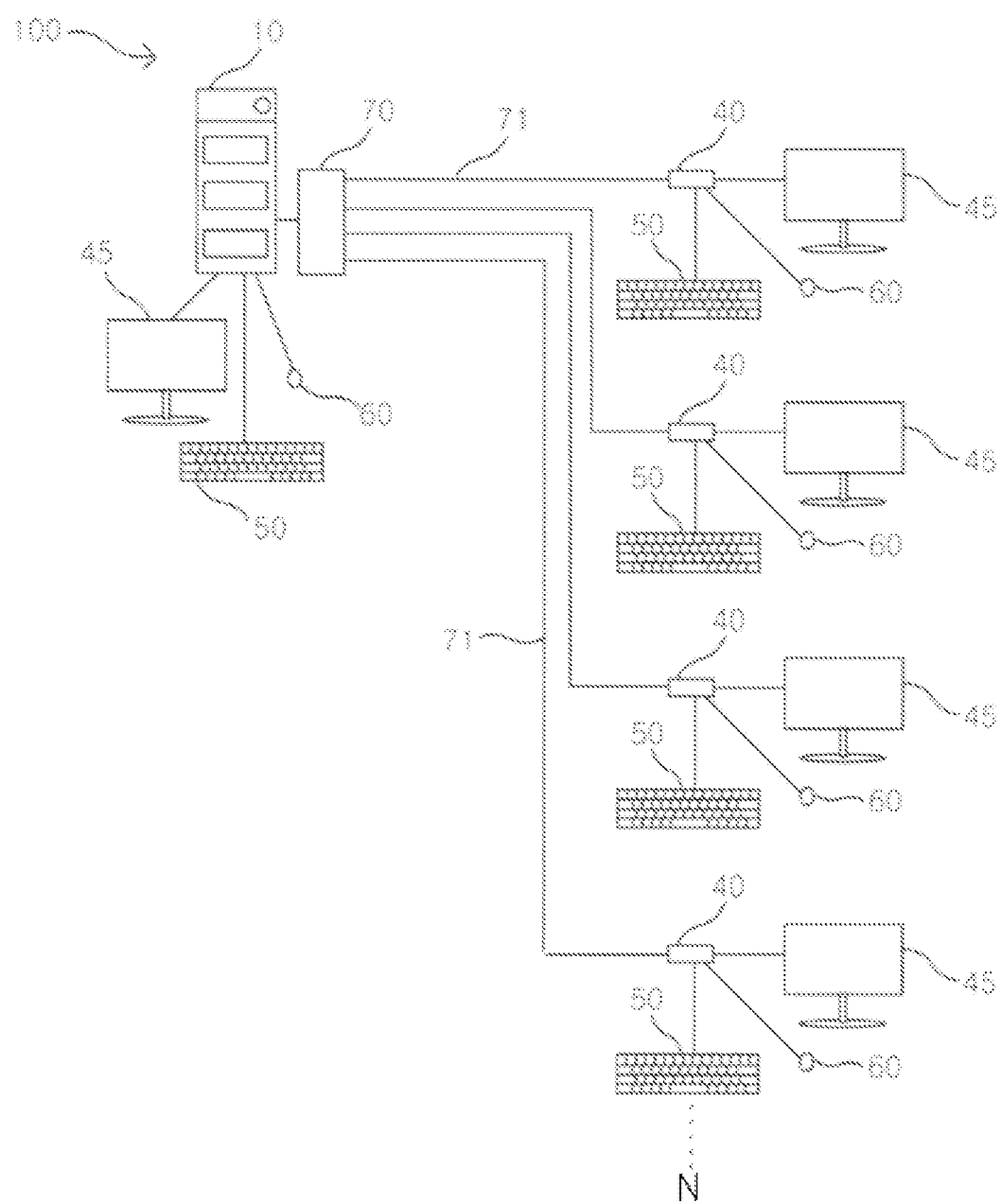
FIG. 4 is a schematic diagram of another configuration of the computer system allowing multiple users to use with the single main computer.

FIG. 3 is a schematic block diagram of a computer system allowing multiple users to use with a single main computer according to another preferred embodiment of the present invention, and FIG. 4 is a schematic diagram of another configuration of the computer system allowing multiple users to use with the single main computer.

Figure 5:
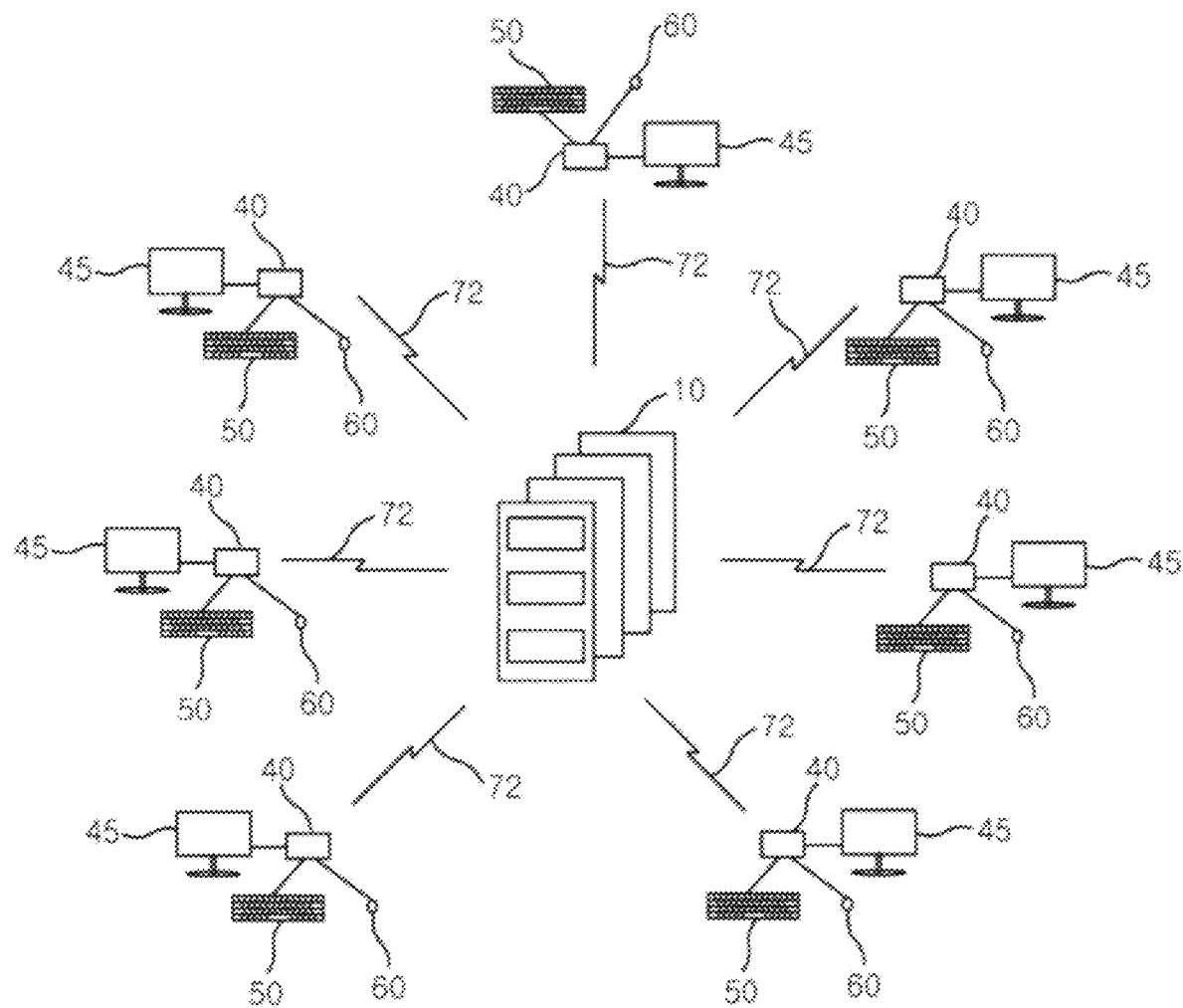
FIG. 5 is a schematic diagram of a further configuration of the computer system allowing multiple users to use with the single main computer.
Figure 6:
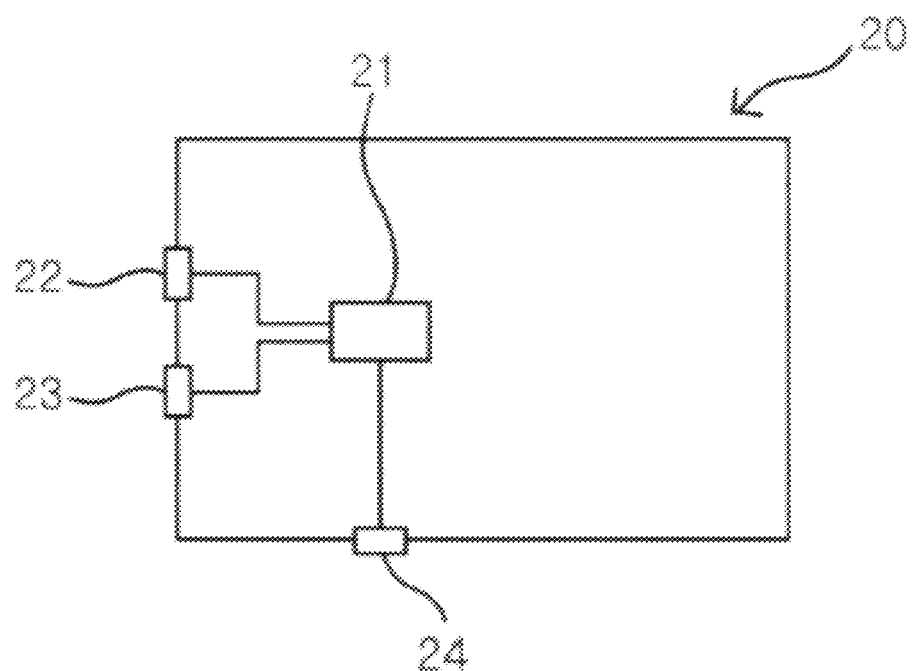
FIG. 6 is a schematic diagram of a first communication device according to a preferred embodiment of the present invention.

FIG. 5 is a schematic diagram of a further configuration of the computer system allowing multiple users to use with the single main computer, and FIG. 6 is a schematic diagram of a first communication device according to a preferred embodiment of the present invention.

Figure 7:
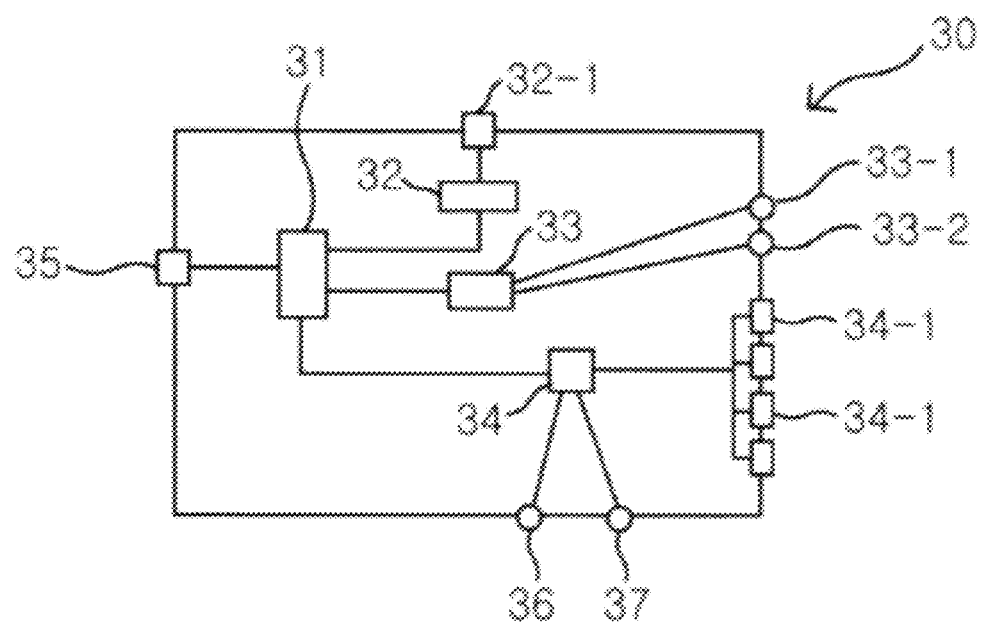
FIG. 7 is a schematic diagram of a second communication device according to a preferred embodiment of the present invention.
Figure 8:
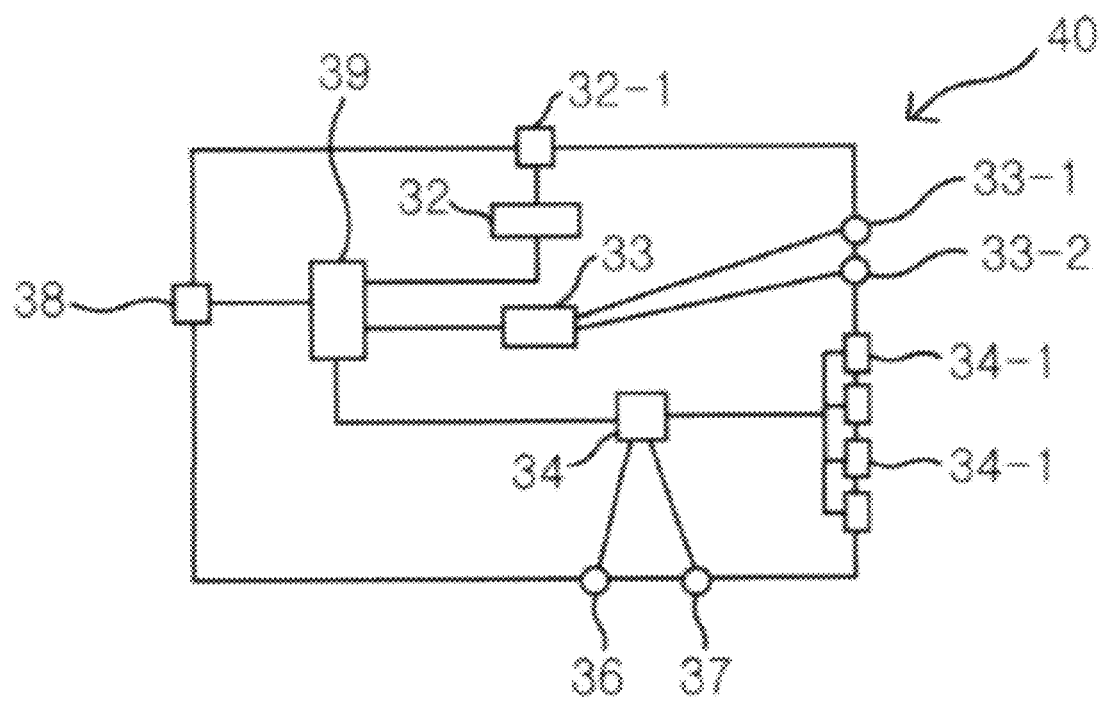
FIG. 8 is a schematic diagram of a communication device according to a preferred embodiment of the present invention.

FIG. 7 is a schematic diagram of a second communication device according to a preferred embodiment of the present invention, and FIG. 8 is a schematic diagram of a communication device according to a preferred embodiment of the present invention.

Figure 9:
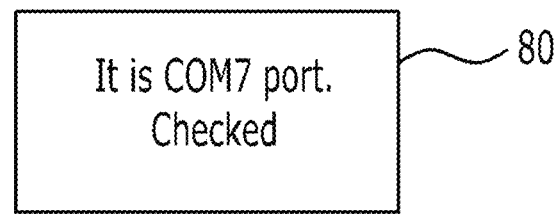
FIG. 9 is a view showing a screen displaying information corresponding to a communication port identified by a communication port identifying unit according to a preferred embodiment of the present invention.
Figure 10:
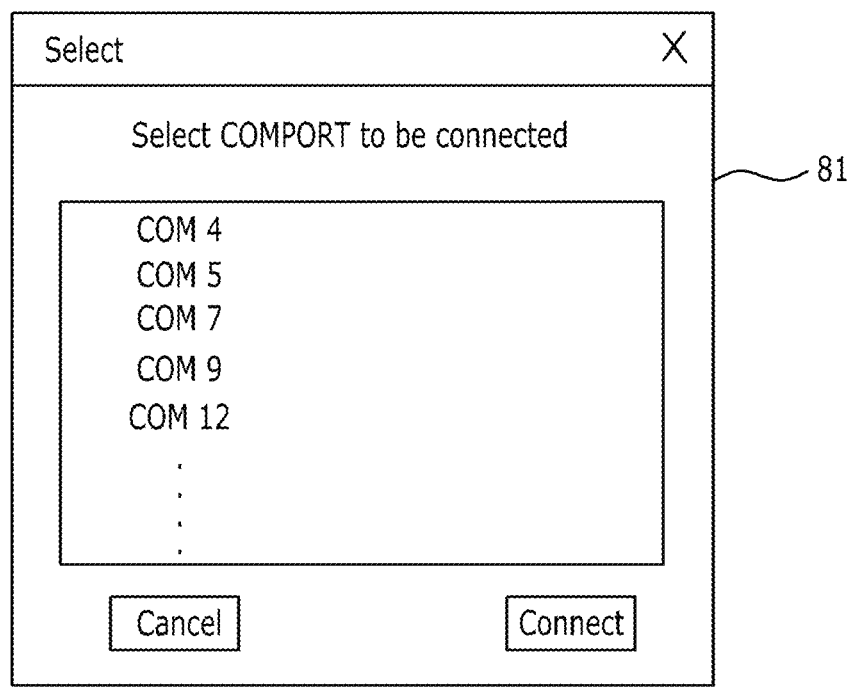
FIG. 10 is a view showing a screen for allowing a user to select a communication port according to information corresponding to the communication port identified by the communication port identifying unit.

FIG. 9 is a view showing a screen displaying information corresponding to a communication port identified by a communication port identifying unit according to a preferred embodiment of the present invention, and FIG. 10 is a view showing a screen for allowing a user to select a communication port according to information corresponding to the communication port identified by the communication port identifying unit.

Figure 11:
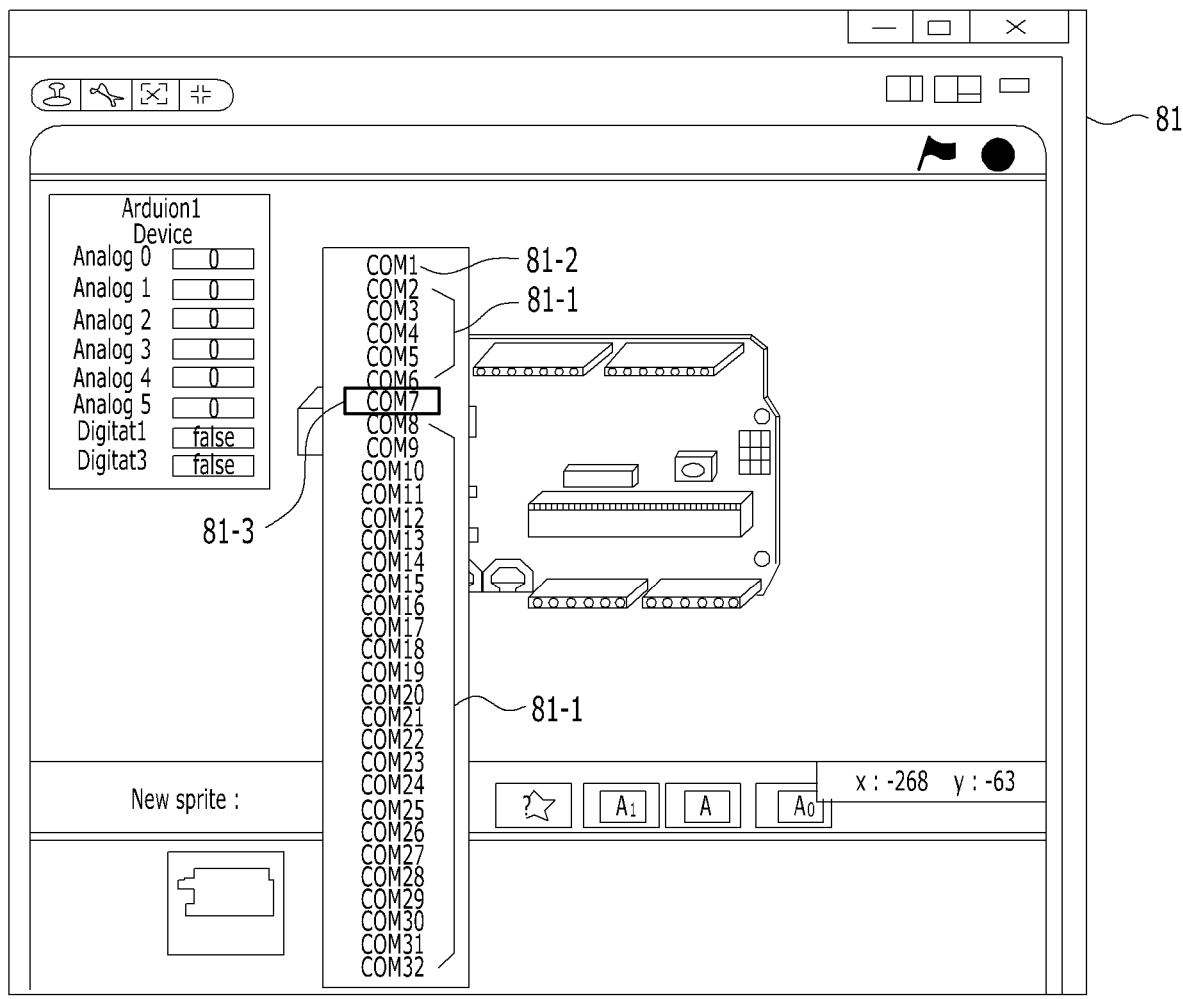
FIG. 11 is a view showing another screen for allowing the user to select a communication port according to information corresponding to the communication port identified by the communication port identifying unit.
Figure 12:
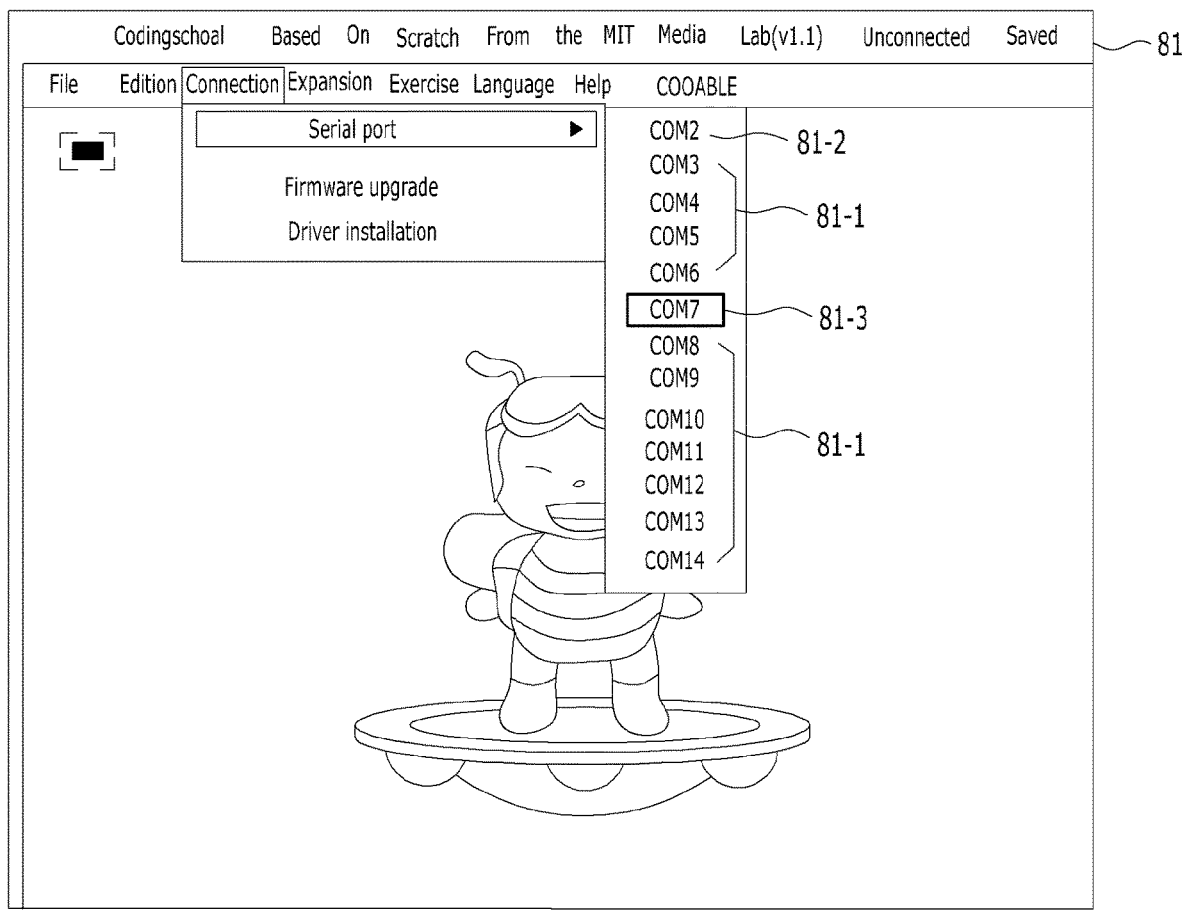
FIG. 12 is a view showing a further screen for allowing the user to select a communication port according to information corresponding to the communication port identified by the communication port identifying unit.

FIG. 11 is a view showing another screen for allowing the user to select a communication port according to information corresponding to the communication port identified by the communication port identifying unit, and FIG. 12 is a view showing a further screen for allowing the user to select a communication port according to information corresponding to the communication port identified by the communication port identifying unit.

Referring to FIGS. 1 to 2, the plurality of first communication devices 20 are connected to the main computer 10, the plurality of second communication devices 30 are connected with the plurality of first communication devices 20, and a monitor 45, a keyboard 50 and a mouse 60 are connected to each of the second communication devices 30.

A graphic card connection unit and an USB connection unit are connected to the main computer 10 and each of the first communication devices 20, and the first communication devices 20 and the second communication devices 30 are connected with each other via UTP cables.

The computer system allowing multiple users to use with the single main computer includes: a main computer 10 for generating a signal so that multiple users can use concurrently; a plurality of first communication devices 20 for receiving the signal from the main computer 10; a plurality of second communication devices 30 for receiving the signal produced by the main computer 10 through the first communication devices 20, wherein each of the second communication devices 30 transfers the signal to a monitor 45 and receives signals from a keyboard 50 and a mouse 60 and sends and receives signals with the first communication device 20; a communication port identifying unit 12 for identifying that any one among the plurality of second communication devices 30 is connected with which one among the plurality of communication ports 13, which are formed as software of the main computer 10, and for transferring the signal to a control unit 11; and the control unit 11 for controlling communication connection between the communication port 13 of the main computer and the software running in the second communication device 30 depending on the signal received from the communication port identifying unit 12.

Moreover, as another preferred embodiment of the present invention, differently from FIGS. 1 and 2, FIGS. 3 to 5 illustrate a method for performing direct communication between the main computer 10 and communication devices 40 without the first communication devices 20. Referring to FIGS. 3 to 5, the computer system allowing multiple users to use with the single main computer includes: a main computer 10 for generating a signal so that multiple users can use concurrently; a plurality of communication devices 40 for receiving the signal from the main computer 10, wherein each of the communication devices 40 transfers the signal to a monitor 45 and receives signals from a keyboard 50 and a mouse 60 and sends and receives signals with the main computer 10; a communication port identifying unit 12 for identifying that any one among the plurality of communication devices 40 is connected with which one among the plurality of communication ports 13, which are formed as software of the main computer 10, and for transferring the signal to a control unit 11; and the control unit 11 for controlling communication connection between the communication port 13 of the main computer and the software running in the communication device 40 depending on the signal received from the communication port identifying unit 12.

Furthermore, the control unit 11 outputs information 80 corresponding to the signal received from the communication port identifying unit 12 to the monitor 45 connected with the corresponding second communication device 30.

Additionally, in another way, the control unit 11 outputs information 80 corresponding to the signal received from the communication port identifying unit 12 to the monitor 45 connected with the corresponding communication device 40.

Referring to FIGS. 6 and 7, each of the first communication devices 20 includes a graphic card connection port 23 connected with a graphic card of the main computer 10; an USB connection port 22 connected with an USB port of the main computer 10; a first signal processing unit 21 for processing the signal transferred through the graphic card connection port 23 and the USB connection port 22; and a second communication unit connection port 24 for transferring the signal processed in the first signal processing unit 21 to the second communication device 30.

Each of the second communication devices 30 includes: a second signal processing unit 31 for processing a signal of a first communication device connection unit 35 for receiving the signal from the first communication device 20; an image signal processing unit 32 for processing an image signal outputted from the monitor 45; a sound signal processing unit 33 connected with a microphone and a speaker; and an USB hub 34 for distributing and processing USB signals from the keyboard 50, the mouse 60, and other various devices.

Referring to FIG. 8, each of the communication devices 40 includes: a main computer connection unit 38 for receiving a signal from the main computer 10 through a network hub 70; a signal processing unit 39 for processing the signal; an image signal processing unit 32 for processing an image signal outputted from the monitor 45; a sound signal processing unit 33 connected with a microphone and a speaker; and an USB hub 34 for distributing and processing USB signals from the keyboard 50, the mouse 60, and other various devices.

Referring to FIGS. 1 and 3, the main computer 10 includes: the control unit 11 for controlling various functions of a computer; the plurality of communication ports 13 for communication connection to perform functions of software running in the second communication devices 30 or the communication devices 40; the communication port identifying unit 12 for identifying that the second communication device 30 or the communication device 40 is connected with which one among the plurality of communication ports 13 and transferring the signal to the control unit 11; and the communication port selection unit 14 for selecting the communication port 13.

Referring to FIGS. 9 to 12, in case of robot education of computer education at school, when multiple users individually connect their robots to USB connection units 34-1 of the second communication devices 30 or the communication devices 40, as shown in FIGS. 10 to 12, a communication port selection screen 81 is displayed on user monitors 45 in order to connect communication with software running in the second communication devices 30 or the communication devices 40.

In this instance, the user must select the communication port 13 connected with the second communication device 30 or the communication device 40, which the user is using, among the plurality of communication ports 13 on the communication port selection screen 81. However, the user may not select the communication port because he or she does not know the second communication device or the communication device 40, which the user is using, is connected with which communication port 13 among the plurality of communication ports 13.

The communication port identifying unit 12 and the control unit 11 may be contained in the OS of the computer to be installed or may be installed separately from the OS.

For instance, if the communication port identifying unit 12 identifies that the second communication device 30 or the communication device 40, which the user is using, has been connected with a port No. 7, the corresponding information is 7. When a signal of the information is transferred to the control unit 11, the control unit 11 outputs information of 'COM7' corresponding to the signal to the monitor 45 connected with the second communication device 30 or the communication device 40 as shown in FIG. 9.

The display form of FIG. 9 is one of various examples, and all information and expression methods corresponding to connection with the port number 7 are considered as corresponding information output.

When a user selects the communication port 13 on the communication port selection screen 81 as shown in FIG. 10, the user selects 'COM7' because checking information of 'COM7' with the naked eyes as shown in FIG. 9. Then, the software running in the second communication device 30 or the communication device 40 is connected with the communication port 'COM7' among the plurality of communication ports 13.

When the users using the second communication devices 30 or the communication devices 40 individually select the connection between the communication ports and the software running in the second communication devices 30 or the communication devices 40, which the users are using, in the same way as the above, the communication connection between each of the communication ports 13 and the software running in each of the second communication devices 30 or each of the communication devices 40 is decided, so that the users can use their communication devices stably without disturbance.

Moreover, even if the user of the second communication device 30 or the communication device 40 does not select the communication port 13, when the communication port identifying unit 12 identifies the communication port 13 and transfers the signal to the control unit 11, the control unit 11 allows the software running in the second communication device 30 to be connected with the communication port 13 corresponding to the received signal.

In another preferred embodiment, the control unit 11 allows the software running in the communication device 40 to be connected with the communication port 13 corresponding to the received signal.

Furthermore, the computer system further includes a communication port selection unit 14 for selecting the communication port 13 so that the software running in the second communication device 30 can be connected with any one of the plurality of communication ports 13 formed in the main computer 10 as software, wherein when the user of at least one second communication device 30 selects the communication port 13 of the information 80 corresponding to the signal received from the communication port identifying unit 12 through the communication port selection unit 14, the control unit 11 allows the software of the second communication device 30 to be connected with the selected communication port 13.

In another preferred embodiment, the computer system further includes a communication port selection unit 14 for selecting the communication port 13 so that the software running in the communication device 40 can be connected with any one of the plurality of communication ports 13 formed in the main computer 10 as software, wherein when the user of at least one communication device 40 selects the communication port 13 of the information 80 corresponding to the signal received from the communication port identifying unit 12 through the communication port selection unit 14, the control unit 11 allows the software of the communication device 40 to be connected with the selected communication port 13.

Referring to FIGS. 11 and 12, the control unit 11 does not output the corresponding information 80 of the communication port 13 identified by the communication port identifying unit 12 differently from FIG. 9. The control unit 11 outputs such that the corresponding communication port 81-3 is differentiated from other communication ports 81-1 through the communication port selection screen 81 displayed on the monitor 45 connected to the second communication device 30 or the communication device 40, so that the user of the second communication device 30 or the communication device 40 can directly select the corresponding communication port 81-3.

That is, the computer system further includes a communication port selection unit 14 for selecting the communication port 13 so that the software running in the second communication device 30 can be connected with any one of the plurality of communication ports 13 formed in the main computer 10 as software, wherein the control unit 11 outputs information of the communication port, to which the software running in the corresponding second communication device 30 will be connected, to be displayed at the uppermost part 81-2 or to be displayed in such a way as to be differentiated 81-3 from other communication ports 81-1, when the communication port selection unit 14 is displayed on the monitor 45 connected with the corresponding second communication device 30.

Furthermore, in another preferred embodiment, the computer system further includes a communication port selection unit 14 for selecting the communication port 13 so that the software running in the communication device 40 can be connected with any one of the plurality of communication ports 13 formed in the main computer 10 as software, wherein the control unit 11 outputs information of the communication port, to which the software running in the corresponding second communication device 30 will be connected, to be displayed at the uppermost part 81-2 or to be displayed in such a way as to be differentiated 81-3 from other communication ports 81-1, when the communication port selection unit 14 is displayed on the monitor 45 connected with the corresponding communication device 40.

To display the corresponding communication port at the uppermost part 81-2 means that the corresponding communication port among the plurality of communication ports is displayed to be higher than other communication ports 81-1 as shown in FIGS. 11 and 12. When the user of the second communication device 30 or the communication device 40 selects the communication port located at the uppermost part 81-2, the software running in the second communication device 30 or the communication device 40 is connected to the communication port to which the second communication device 30 or the communication device 30 is connected.

As shown in FIGS. 11 and 12, in order to differentiate the corresponding communication port 81-3 from other communication ports 81-1, the corresponding communication port 81-3 may be in bold, in colors, or in flicker, so that the user of the second communication device 30 or the communication device 40 can select the differentiated communication port 81-3. When the user selects the differentiated communication port 81-3, the software running in the second communication device 30 or the communication device 40 is connected to the communication port to which the second communication device 30 or the communication device 30 is connected.

Additionally, the computer system can designate the communication port so that any one of the plurality of communication ports 13 formed in the main computer 10 as software can be connected with the software running in one among the plurality of second communication devices 30, wherein the control unit 11 does not change the communication port for connection with the software of the second communication device 30 if the signal transferred by the communication port identifying unit 12 matches the designated communication port, but changes the communication port to the designated communication port 30 if the signal transferred by the communication port identifying unit 12 does not match.

In another preferred embodiment, the computer system can designate the communication port so that any one of the plurality of communication ports 13 formed in the main computer 10 as software can be connected with the software running in one among the plurality of communication devices 40, wherein the control unit 11 does not change the communication port for connection with the software of the communication device 40 if the signal transferred by the communication port identifying unit 12 matches the designated communication port, but changes the communication port to the designated communication port if the signal transferred by the communication port identifying unit 12 does not match.

According to another preferred embodiment of the present invention, the computer system allowing multiple users to use with a single main computer includes: a main computer 10 for generating a signal so that multiple users can use concurrently; a plurality of second communication devices 30 or a plurality of communication devices 40 for receiving signals produced by the main computer 10 and transferring the signals to monitors, wherein each of the second communication devices 30 or the communication devices 40 sends and receives the signals with the main computer 10 by receiving signals from a keyboard 50 and a mouse 60; and a control unit 11, which identifies whether or not at least one second communication device 30 among the plurality of second communication devices 30 or at least one communication device 40 among the plurality of communication devices 40 is connected with one among the plurality of communication ports 13 formed in the main computer as software and outputs information corresponding to the identified communication port to the monitor connected with the second communication device 30 or the communication device 40, or which controls the software running in the second communication device 30 or the communication device 40 to be connected with the communication port formed in the main computer corresponding to the signal received from a communication port identifying unit 12.

Other detailed descriptions will be omitted to avoid repetition in description because they are the same as the above.

Figure 13:
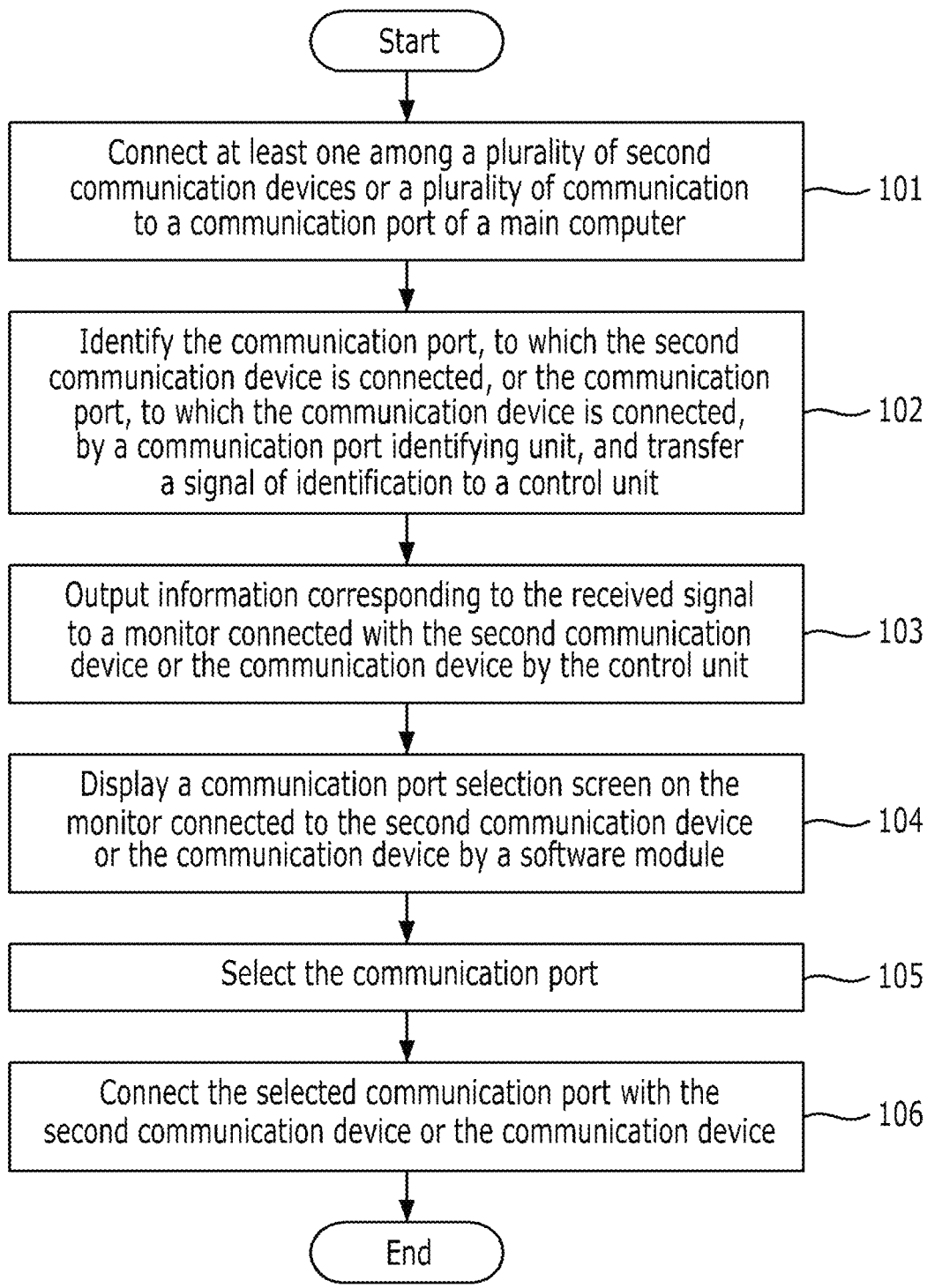
FIG. 13 is a flow chart showing an operation method of the computer system allowing multiple users to use with a single main computer according to a preferred embodiment of the present invention.
Figure 14:
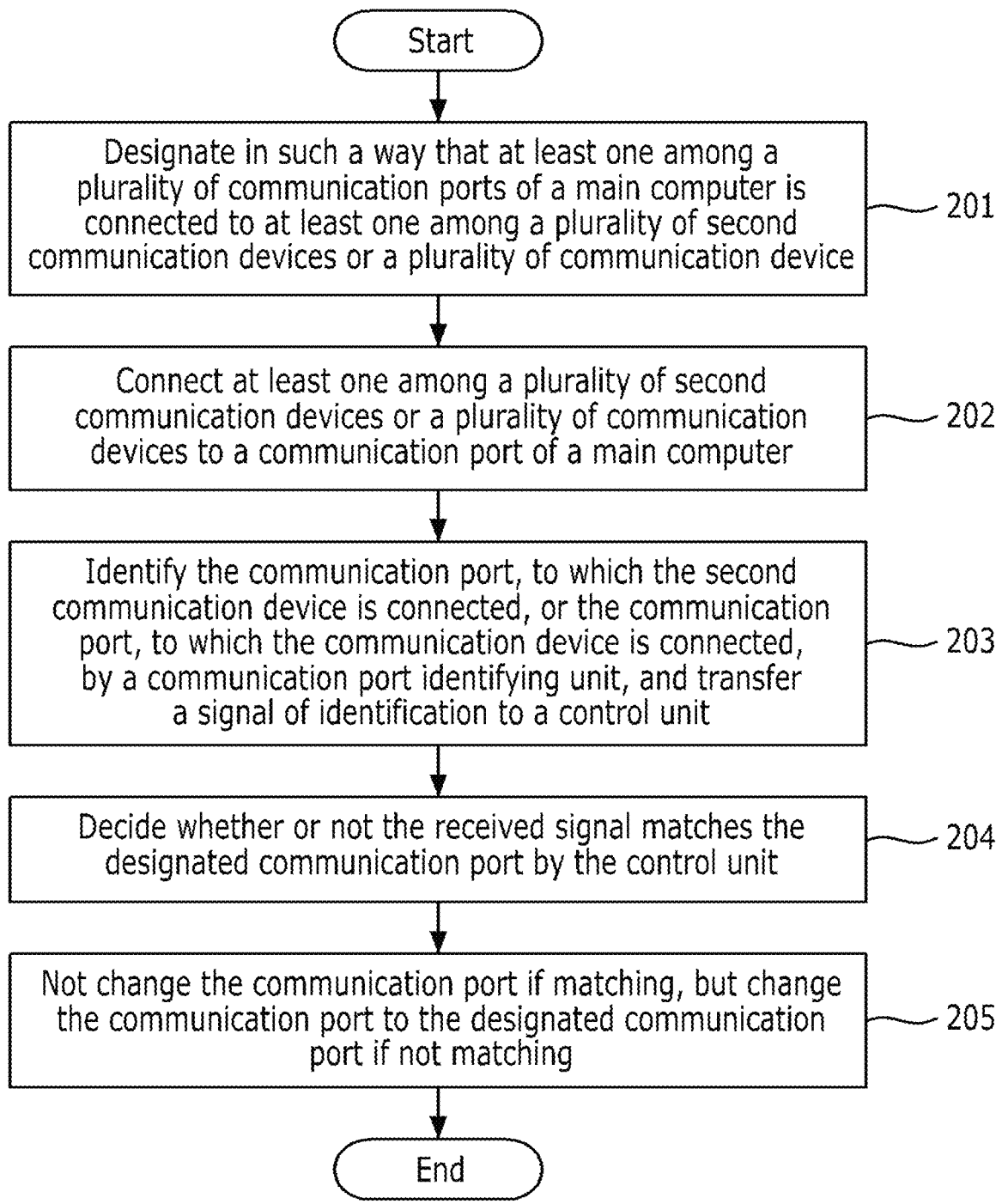
FIG. 14 is a flow chart showing an operation method of the computer system allowing multiple users to use with a single main computer according to another preferred embodiment of the present invention.
Figure 15:
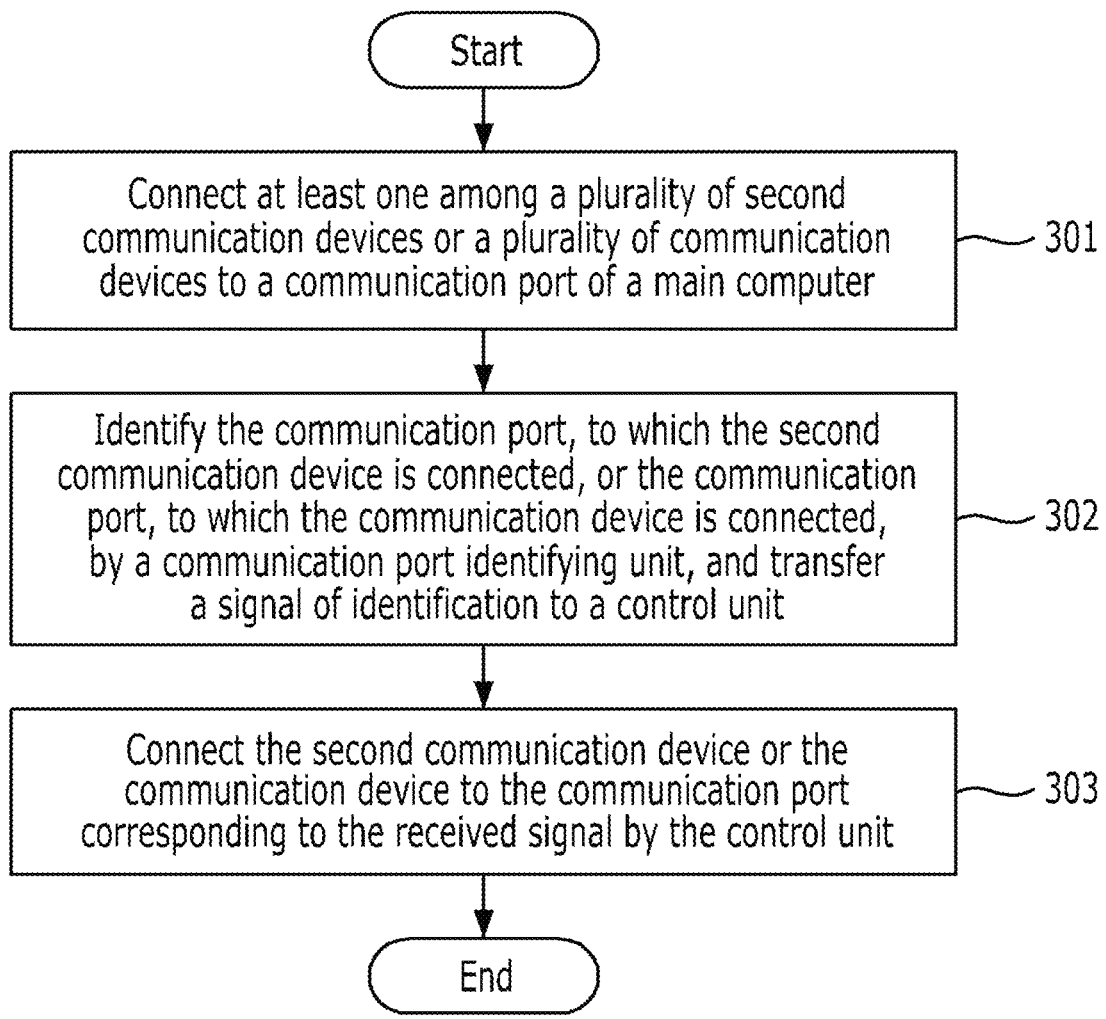
FIG. 15 is a flow chart showing an operation method of the computer system allowing multiple users to use with a single main computer according to a further preferred embodiment of the present invention.

FIG. 13 is a flow chart showing an operation method of the computer system allowing multiple users to use with a single main computer according to a preferred embodiment of the present invention, FIG. 14 is a flow chart showing an operation method of the computer system allowing multiple users to use with a single main computer according to another preferred embodiment of the present invention, and FIG. 15 is a flow chart showing an operation method of the computer system allowing multiple users to use with a single main computer according to a further preferred embodiment of the present invention.

Referring to FIG. 13, the operation method of the computer system allowing multiple users to use with the single main computer includes: a) a step 101 of connecting at least one among a plurality of second communication devices 30 or a plurality of communication devices 40 connected to a main computer 10 to a communication port 13 formed in the main computer 10 as software; b) a step 102 of identifying the communication port, to which the second communication device 30 is connected and which is formed as software, or the communication port, to which the communication device 40 is connected, by a communication port identifying unit 12, and transferring a signal of identification to a control unit 11; c) a step 103 of outputting information corresponding to the signal received in the step b) to a monitor 45 connected with the second communication device 30 or the communication device 40 by the control unit 11; d) a step 104 of displaying a communication port selection screen 81 on the monitor 45 connected to the second communication device 30 or the communication device 40 by a software module of the second communication device 30 or the communication device 40; e) a step 105 of selecting the communication port, which is formed as software, through the communication port selection screen 81 displayed in the step d) by a user of the second communication device 30 or the communication device 40; and f) a step 106 of connecting the selected communication port 13, which is formed in the main computer 10 as software, with software, which is running in the second communication device 30 or the communication device 40, by the control unit 11.

Referring to FIG. 14, according to another preferred embodiment of the present invention, the operation method of the computer system allowing multiple users to use with the single main computer includes: a) a step 201 of designating in such a way that at least one among a plurality of communication ports 13, which are formed in a main computer 10 as software, is connected to software, which is running in at least one among a plurality of second communication devices 30 or a plurality of communication device 40 connected to the main computer 10; b) a step 202 of connecting at least one among the plurality of second communication devices 30 or the plurality of communication devices 40 to at least one among a plurality of communication ports 13 formed in the main computer 10 as software; c) a step 203 of identifying the communication port, to which the second communication device 30 is connected, or the communication port, to which the communication device 40 is connected and which is formed as software, by a communication port identifying unit 12, and transferring a signal of identification to a control unit 11; d) a step 204 of deciding whether or not the signal received in the step c) matches the communication port 13 designated in the step a) by the control unit 11; and e) a step 205 of not changing the communication port if the communication port matches the software designated in the step a) but changing the communication port to the communication port designated in the step a) if the communication port does not match according to the identification of the step d).

Referring to FIG. 15, according to another preferred embodiment of the present invention, the operation method of the computer system allowing multiple users to use with the single main computer includes: a) a step 301 of connecting at least one among a plurality of second communication devices 30 or a plurality of communication devices 40 connected to a main computer 10 to a communication port 13 formed in the main computer 10 as software; b) a step 302 of identifying the communication port, to which the second communication device 30 is connected and which is formed as software, or the communication port, to which the communication device 40 is connected and which is formed as software, by a communication port identifying unit 12, and transferring a signal of identification to a control unit 11; and c) a step 303 of connecting the software of the second communication device 30 or the communication device 40 to the communication port corresponding to the signal received in the step b) by the control unit 11.

In the present invention, the 'main computer' means all devices for processing signals, such as a general main frame of a computer, a computer for a server, or a large-sized central server.

Moreover, the main computer and the second communication device 30 are connected with each other through the first communication device 20, and the communication device 40 is directly connected with the main computer 10 without the first communication device 20. Connection between the main computer 10 and the second communication device 30 or the communication device 40 may be achieved by various methods, such as wired connection, wireless connection, direct connection, internet connection, and so on.

As shown in FIG. 5, the main computer 10 may be a large-sized server. Even if the communication device 40 is connected through an internet network 72 using the large-sized server 10 for system construction of virtual desktop infrastructure (VDI), the large-sized server is the main computer 10 in the present invention, and terminals 40 connected through the internet are the communication devices in the present invention.

The embodiments described in the present invention show combination of components and features of the present invention. The components and features must be selectively considered, unless specifically noted. The components and features may be executed without combination. In addition, the embodiments of the present invention may be realized in combination of some components and features.

The sequential order of the operations described in the present invention may be changed. Some components and features of any one embodiment may be included in other embodiments, or may be replaced with corresponding components and features of other embodiments.

It is obvious that the embodiments may be formed through combination of claims which are not in specified citation relation or new claims may be added by amendment after filing.

The embodiments of the present invention may be realized by various means, for instance, hardware, firmware, software or combination of them. In case of hardware, the embodiments of the present invention may be realized by one or more application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

In case of firmware or software, the embodiments of the present invention may be realized in the form of modules, processes and functions for performing the above-mentioned functions or operations.

Software codes may be stored in a memory unit and operated by a processor. The memory unit is located inside or outside the processor, and can send and receive data with the processor by various well-known means.

While the present invention has been particularly shown and described with reference to exemplary embodiments thereof, it will be understood by those of ordinary skill in the art that various changes, modifications, and equivalents may be made therein without departing from the technical idea and scope of the present invention and such changes, modifications, and equivalents belong to the claims of the present invention.

The present invention may be carried out in other specific ways than those set forth herein without departing from the characteristics of the present invention. Therefore, the above embodiments should be construed in all aspects as illustrative and not restrictive.

The scope of the invention should be determined by the appended claims and their legal equivalents, and all changes coming within the meaning and equivalency range of the appended claims are intended to be embraced therein.

EXPLANATION OF REFERENCE NUMERALS IN DRAWINGS

FIG. 1, 3
10: Main computer
11: Control unit
12: Communication port identifying unit
13: A plurality of communication ports
14: Communication port selection unit
20: First communication device
21: First signal processing unit
22: USB connection port of main computer
23: Graphic card connection port of main computer
24: Second communication device connection port
30: Second communication device
31: Second signal processing unit
32: Image signal processing unit
32-1: Monitor connection unit
33: Sound signal processing unit
33-1: Speaker connection unit
33-2: Microphone connection unit
34: USB hub
34-1: USB connection unit
35: First communication device connection unit
36: Keyboard connection unit
37: Mouse connection unit
38: Main computer connection unit
39: Signal processing unit
40: Communication device
45: Monitor
50: Keyboard
60: Mouse
70: Network hub
71: Communication cable
72: Internet network
80: Corresponding information of identified communication port
81: Communication port selection screen
81-1: Other communication ports
81-2: Uppermost part
81-3: Differentiated, corresponding communication port
101: Connect at least one among a plurality of second communication devices or a plurality of communication devices to a communication port of a main computer
102: Identify the communication port, to which the second communication device is connected, or the communication port, to which the communication device is connected, by a communication port identifying unit, and transfer a signal of identification to a control unit
103: Output information corresponding to the received signal to a monitor connected with the second communication device or the communication device by the control unit
104: Display a communication port selection screen on the monitor connected to the second communication device or the communication device by a software module
105: Select the communication port
106: Connect the selected communication port with the second communication device or the communication device
201: Designate in such a way that at least one among a plurality of communication ports of a main computer is connected to at least one among a plurality of second communication devices or a plurality of communication device
202: Connect at least one among a plurality of second communication devices or a plurality of communication devices to a communication port of a main computer
203: Identify the communication port, to which the second communication device is connected, or the communication port, to which the communication device is connected, by a communication port identifying unit, and transfer a signal of identification to a control unit
204: Decide whether or not the received signal matches the designated communication port by the control unit
205: Not change the communication port if matching, but change the communication port to the designated communication port if not matching
301: Connect at least one among a plurality of second communication devices or a plurality of communication devices to a communication port of a main computer
302: Identify the communication port, to which the second communication device is connected, or the communication port, to which the communication device is connected, by a communication port identifying unit, and transfer a signal of identification to a control unit 303: Connect the second communication device or the communication device to the communication port corresponding to the received signal by the control unit

What is claimed is:

1. A computer system allowing multiple users to use with a single main computer comprising:
a main computer for generating a signal such that multiple users can use concurrently;
a plurality of first communication devices for receiving the signal from the main computer;
a plurality of second communication devices for receiving the signal produced by the main computer through the first communication devices, wherein each of the second communication devices transfers the signal to a monitor and receives signals from a keyboard and a mouse and sends and receives signals with the first communication device;
a communication port identifying unit for identifying that any one among the plurality of second communication devices connected to robots is connected with which one among a plurality of communication ports, which are formed as software of the main computer, and for transferring the signal to a control unit;
the control unit for controlling communication connection between the communication port of the main computer and a software running in the second communication device depending on the signal received from the communication port identifying unit, and
a communication port selection unit for selecting the communication port such that the software running in the second communication device is connected with any one of the plurality of communication ports formed in the main computer as software;
wherein the control unit outputs information of the communication port, to which the software running in the corresponding second communication device will be connected, to be displayed at the uppermost part or to be displayed in such a way as to be differentiated from other communication ports, when the communication port selection unit is displayed on the monitor connected with the corresponding second communication device.

2. The computer system according to claim 1, wherein the control unit outputs information corresponding to the signal received from the communication port identifying unit to the monitor connected with the corresponding second communication device.

3. The computer system according to claim 2,
wherein when the user of at least one second communication device selects the communication port of the information corresponding to the signal received from the communication port identifying unit through the communication port selection unit, the control unit allows the software of the second communication device to be connected with the selected communication port.

4. The computer system according to claim 1, wherein the control unit allows the software running in the second communication device to be connected with the communication port corresponding to the received signal.

5. The computer system according to claim 1, wherein the computer system designates the communication port such that any one of the plurality of communication ports formed in the main computer as software is connected with the software running in one among the plurality of second communication devices, and
wherein the control unit does not change the communication port for connection with the software of the second communication device if the signal transferred by the communication port identifying unit matches the designated communication port, but changes the communication port to the designated communication port if the signal transferred by the communication port identifying unit does not match.

6. A computer system allowing multiple users to use with a single main computer comprising:
a main computer for generating a signal such that multiple users can use concurrently;
a plurality of communication devices for receiving the signal from the main computer, wherein each of the communication devices transfers the signal to a monitor and receives signals from a keyboard and a mouse and sends and receives signals with the main computer;
a communication port identifying unit for identifying that any one among the plurality of communication devices connected to robots is connected with which one among a plurality of communication ports, which are formed as software of the main computer, and for transferring the signal to a control unit;
and the control unit for controlling communication connection between the communication port of the main computer and a software running in the communication device depending on the signal received from the communication port identifying unit,
a communication port selection unit for selecting the communication port such that the software running in the second communication device is connected with any one of the plurality of communication ports formed in the main computer as software;
wherein the control unit outputs information of the communication port, to which the software running in the corresponding second communication device will be connected, to be displayed at the uppermost part or to be displayed in such a way as to be differentiated from other communication ports, when the communication port selection unit is displayed on the monitor connected with the corresponding second communication device.

7. The computer system according to claim 6, wherein the control unit outputs information corresponding to the signal received from the communication port identifying unit to the monitor connected with the corresponding communication device.

8. The computer system according to claim 7,
wherein when the user of at least one communication device selects the communication port of the information corresponding to the signal received from the communication port identifying unit through the communication port selection unit, the control unit allows the software of the second communication device to be connected with the selected communication port.

9. The computer system according to claim 6, wherein the control unit allows the software running in the communication device to be connected with the communication port corresponding to the received signal.

10. The computer system according to claim 6, wherein the computer system designates the communication port such that any one of the plurality of communication ports formed in the main computer as software is connected with the software running in one among the plurality of communication devices, and
wherein the control unit does not change the communication port for connection with the software of the communication device if the signal transferred by the communication port identifying unit matches the designated communication port, but changes the communication port to the designated communication port if the signal transferred by the communication port identifying unit does not match.

11. A computer system allowing multiple users to use with a single main computer comprising:
a main computer for generating a signal such that multiple users can use concurrently;
a plurality of second communication devices or a plurality of communication devices for receiving signals produced by the main computer and transferring the signals to monitors, wherein each of the plurality of second communication devices or each of the plurality of communication devices sends and receives the signals with the main computer by receiving signals from a keyboard and a mouse;
a control unit, which identifies whether or not at least one second communication device among the plurality of second communication devices connected to robots or at least one communication device among the plurality of communication devices is connected with one among a plurality of communication ports formed in the main computer as software and outputs information corresponding to the identified communication port to the monitor connected with the second communication device or the communication device, or which controls a software running in the second communication device or the communication device to be connected with the communication port formed in the main computer corresponding to the signal received from a communication port identifying unit; and
a communication port selection unit for selecting the communication port such that the software running in the second communication device is connected with any one of the plurality of communication ports formed in the main computer as software;
wherein the control unit outputs information of the communication port, to which the software running in the corresponding second communication device will be connected, to be displayed at the uppermost part or to be displayed in such a way as to be differentiated from other communication ports, when the communication port selection unit is displayed on the monitor connected with the corresponding second communication device.

12. A method of operating a computer system allowing multiple users to use with a single main computer, comprising the steps of:
a) connecting at least one among a plurality of second communication devices connected to robots or a plurality of communication devices connected to a main computer to a communication port formed in the main computer as software;
b) identifying the communication port, to which the second communication device is connected and which is formed as software, or the communication port, to which the communication device is connected, by a communication port identifying unit, and transferring a signal of identification to a control unit;
c) outputting information corresponding to the signal received in the step b) to a monitor connected with the second communication device or the communication device by the control unit;
d) displaying a communication port selection screen on the monitor connected to the second communication device or the communication device by a software module of the second communication device or the communication device;
e) selecting the communication port, which is formed as software, through the communication port selection screen displayed in the step d) by a user of the second communication device or the communication device; and
f) connecting the selected communication port, which is formed in the main computer as software, with software, which is running in the second communication device or the communication device, by the control unit,
wherein the control unit outputs information of the communication port, to which the software running in the corresponding second communication device will be connected, to be displayed at the uppermost part or to be displayed in such a way as to be differentiated from other communication ports, when the communication port selection screen is displayed on the monitor connected with the corresponding second communication device.

13. A method of operating a computer system allowing multiple users to use with a single main computer, comprising the steps of:
a) designating in such a way that at least one among a plurality of communication ports, which are formed in a main computer as software, is connected to software, which is running in at least one among a plurality of second communication devices or a plurality of communication device connected to the main computer;
b) connecting at least one among the plurality of second communication devices or the plurality of communication devices to at least one among a plurality of communication ports formed in the main computer as software;
c) identifying the communication port, to which the second communication device is connected, or the communication port, to which the communication device is connected and which is formed as software, by a communication port identifying unit, and transferring a signal of identification to a control unit;
d) deciding whether or not the signal received in the step c) matches the communication port designated in the step a) by the control unit;
e) not changing the communication port if the communication port matches the software designated in the step a) but changing the communication port to the communication port designated in the step a) if the communication port does not match according to the identification of the step d); and
f) selecting the communication port such that the software running in the second communication device is connected with any one of the plurality of communication ports formed in the main computer as software,
wherein the control unit outputs information of the communication port, to which the software running in the corresponding second communication device will be connected, to be displayed at the uppermost part or to be displayed in such a way as to be differentiated from other communication ports, when the communication port selection screen is displayed on the monitor connected with the corresponding second communication device.

14. A method of operating a computer system allowing multiple users to use with a single main computer, comprising the steps of:

a) connecting at least one among a plurality of second communication devices connected to robots or a plurality of communication devices connected to a main computer to a communication port formed in the main computer as software;
b) identifying the communication port, to which the second communication device is connected and which is formed as software, or the communication port, to which the communication device is connected and which is formed as software, by a communication port identifying unit, and transferring a signal of identification to a control unit;
c) connecting a software of the second communication device or the communication device to the communication port corresponding to the signal received in the step b) by the control unit; and
d) selecting the communication port such that the software running in the second communication device is connected with any one of the plurality of communication ports formed in the main computer as software, wherein the control unit outputs information of the communication port, to which the software running in the corresponding second communication device will be connected, to be displayed at the uppermost part or to be displayed in such a way as to be differentiated from other communication ports, when the communication port selection screen is displayed on the monitor connected with the corresponding second communication device.

* * * * *